(12) United States Patent
Su et al.

(10) Patent No.: US 6,993,688 B2
(45) Date of Patent: Jan. 31, 2006

(54) DATA SECTOR ERROR TRACKING AND CORRECTION MECHANISM

(75) Inventors: Hui Su, Longmont, CO (US); Gregory P. Moller, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 445 days.

(21) Appl. No.: 10/071,018

(22) Filed: Feb. 7, 2002

(65) Prior Publication Data

US 2003/0061552 A1 Mar. 27, 2003

Related U.S. Application Data

(60) Provisional application No. 60/325,339, filed on Sep. 27, 2001.

(51) Int. Cl.
*G06F 11/00* (2006.01)
*G11C 29/00* (2006.01)

(52) U.S. Cl. .............................. 714/704; 714/769
(58) Field of Classification Search ............. 714/704, 714/706, 708, 769, 770; 369/53.35, 53.36; 360/53
See application file for complete search history.

(56) References Cited

U.S. PATENT DOCUMENTS

| | | | |
|---|---|---|---|
| 4,138,719 A | 2/1979 | Swanstrom et al. | 364/200 |
| 4,194,685 A | 3/1980 | Hill et al. | 235/375 |
| 4,321,700 A | 3/1982 | Russell | 369/44 |
| 4,429,217 A | 1/1984 | Hill et al. | 235/380 |
| 4,438,463 A | 3/1984 | Sakamoto | 360/10.2 |
| 4,445,189 A | 4/1984 | Hyatt | 364/600 |
| 4,886,958 A | 12/1989 | Merryman et al. | 250/201 |
| 4,912,487 A | 3/1990 | Porter et al. | 346/108 |
| 5,012,073 A | 4/1991 | Hewitt et al. | 235/375 |
| 5,095,447 A | 3/1992 | Manns et al. | 395/161 |
| 5,220,569 A | 6/1993 | Hartness | 371/37.7 |
| 5,359,468 A | 10/1994 | Rhodes et al. | 360/48 |
| 5,386,405 A | 1/1995 | Fujiwara et al. | 369/59 |
| 5,438,462 A | 8/1995 | Copolillo | 360/53 |
| 5,469,418 A * | 11/1995 | Satoh et al. | 369/53.36 |
| 5,602,857 A | 2/1997 | Zook et al. | 371/140.1 |
| 5,629,949 A | 5/1997 | Zook | 371/37.1 |
| 5,661,848 A | 8/1997 | Bonke et al. | 395/439 |
| 5,677,901 A * | 10/1997 | Iwamura | 369/47.31 |
| 5,682,272 A | 10/1997 | Taroda et al. | 360/53 |
| 5,699,342 A | 12/1997 | Yagi et al. | 369/116 |
| 5,740,267 A | 4/1998 | Echerer et al. | 382/132 |
| 5,748,578 A | 5/1998 | Schell | 369/44.14 |
| 5,774,357 A | 6/1998 | Hoffberg et al. | 364/188 |
| 5,808,825 A | 9/1998 | Okamura | 360/75 |
| 5,844,919 A | 12/1998 | Glover et al. | 371/40.14 |

(Continued)

OTHER PUBLICATIONS

U.S. Appl. No. 09/897,802, filed Jun. 29, 2001, Choo.

*Primary Examiner*—Joseph D. Torres
(74) *Attorney, Agent, or Firm*—Todd R. Fronek; Westman, Champlin & Kelly (57) ABSTRACT

A method is provided for reducing growth errors in disc drive. First, a number of sectors to be read is determined. Data is then read from all sectors of the number of sectors on a disc during a first disc revolution. Next, error sectors having a number of errors above a predetermined threshold are identified. The error sectors are then corrected and written to the disc during a second disc revolution. In addition, a disc drive having a controller for implementing the above method is provided.

13 Claims, 5 Drawing Sheets

U.S. PATENT DOCUMENTS

| | | | |
|---|---|---|---|
| 5,850,304 A | 12/1998 | Elmers et al. | 369/142 |
| 5,966,121 A | 10/1999 | Hubbell et al. | 345/328 |
| 6,092,231 A | 7/2000 | Sze | 714/758 |
| 6,122,235 A | 9/2000 | Arai | 369/54 |
| 6,192,499 B1 | 2/2001 | Yang | 714/785 |
| 6,230,311 B1 | 5/2001 | Gerard et al. | 717/2 |
| 6,247,152 B1 | 6/2001 | Russell | 714/718 |
| 6,728,053 B2 * | 4/2004 | Choo et al. | 360/53 |

* cited by examiner

DATA SECTOR ERROR TRACKING AND CORRECTION MECHANISM

CROSS-REFERENCE TO RELATED APPLICATION

This application claims priority from U.S. Provisional Application 60/325,339 filed on Sep. 27, 2001, for inventors Hui Su and Gregory P. Moller and entitled "DATA SECTOR ERROR TRACKING AND CORRECTION MECHANISM".

FIELD OF THE INVENTION

The present invention relates generally to disc drive data storage systems, and more particularly but not by limitation to an error correction mechanism for data sectors.

BACKGROUND OF THE INVENTION

In a disc drive, data is stored on one or more discs. A disc is typically divided into a plurality of generally parallel disc tracks, which are arranged concentrically with one another and perpendicular to the disc radius. Each track is further broken down into a plurality of sectors, which further aid in locating information. Typically, the disc is a magnetic recording that uses single-state domains and magnetic transition domains to store bits corresponding to a "1" or "0" on the disc surface. Usually, a magnetic domain contains at least 100 thermally stable grains or magnetic particles.

The data is stored and retrieved by a transducer or "head" that is positioned over a desired track by an actuator arm. Typically, when a read operation is sent from a host (such as a computer) to the disc drive, a controller converts a logical block address (LBA) received from the host to a physical block address (PBA). Next, the physical track, head and sector information, which includes the number of sectors to be read from a destination track, are calculated based on the PBA. A seek operation is then performed and sectors falling on the same track are usually read within a disc revolution. Data read from the disc is transferred to a buffer random access memory (RAM) inside the disc drive before being sent to the host.

It is common to encounter disc read-errors when the disc drive is transferring data from the disc to the buffer RAM inside the disc drive. Error correction is typically performed on the disc read-errors to correct data that is sent to the host. However, ever increasing disc drive densities increase the number of errors encountered. Some errors occur momentarily due to system noise, thermal conditions or external vibrations. Small magnetic domains have a propensity to reverse their magnetic state due to these conditions. These and other errors may propagate into large errors (growth errors) under certain conditions that ultimately cause long correction times and unrecoverable errors.

In current systems, growth errors are prevented by correcting errors in a sector (known as an "error sector") that has more errors than a threshold level. Threshold levels below the maximum correction capability are used to prevent growth errors. When an error sector is encountered during a read operation, the controller stops the read operation and applies a retry routine that re-reads the error sector into the buffer memory. Then, the error sector is corrected and written back to the disc during the retry routine. Stopping the read operation for each error sector encountered and performing a retry routine on the error sector results in extra revolutions for the read operation, which increases overhead. Alternatively, an entire data track can be written into the data buffer and written back to the disc to reduce disc revolutions in a retry routine. However, this dramatically increases the data buffer size and causes retry routines to be time consuming and expensive since every sector has to be read into the data buffer no matter whether the data sector has errors or not. Various embodiments of the present invention address these problems, and offer other advantages over the prior art.

SUMMARY OF THE INVENTION

The present invention relates to solving the above-mentioned problems in a disc drive storage system. In one embodiment, a method first determines a number of sectors to be read from a disc. The method also includes a step wherein data is read from all sectors of the number of sectors during a first disc revolution. As this data is read, errors sectors are identified that have a number of errors above a predetermined threshold. Next, data from the error sectors is corrected. During a second disc revolution, corrected data is written back to the error sectors. In a further embodiment, data is read from just the sectors failing the threshold check and corrected on-the-fly during an intermediate disc revolution.

The present invention also can be implemented in a disc drive storage system. The disc drive includes a controller for performing instructions executing the above-mentioned method.

These and various other features as well as advantages, which characterize various embodiments of the present invention, will be apparent upon reading of the following detailed description and review of the associated drawings.

BRIEF DESCRIPTION OF THE DRAWINGS

FIG. 3-1 is an illustration of a plurality of sectors in a data track on a disc.

DETAILED DESCRIPTION OF ILLUSTRATIVE EMBODIMENTS

Figure 1:
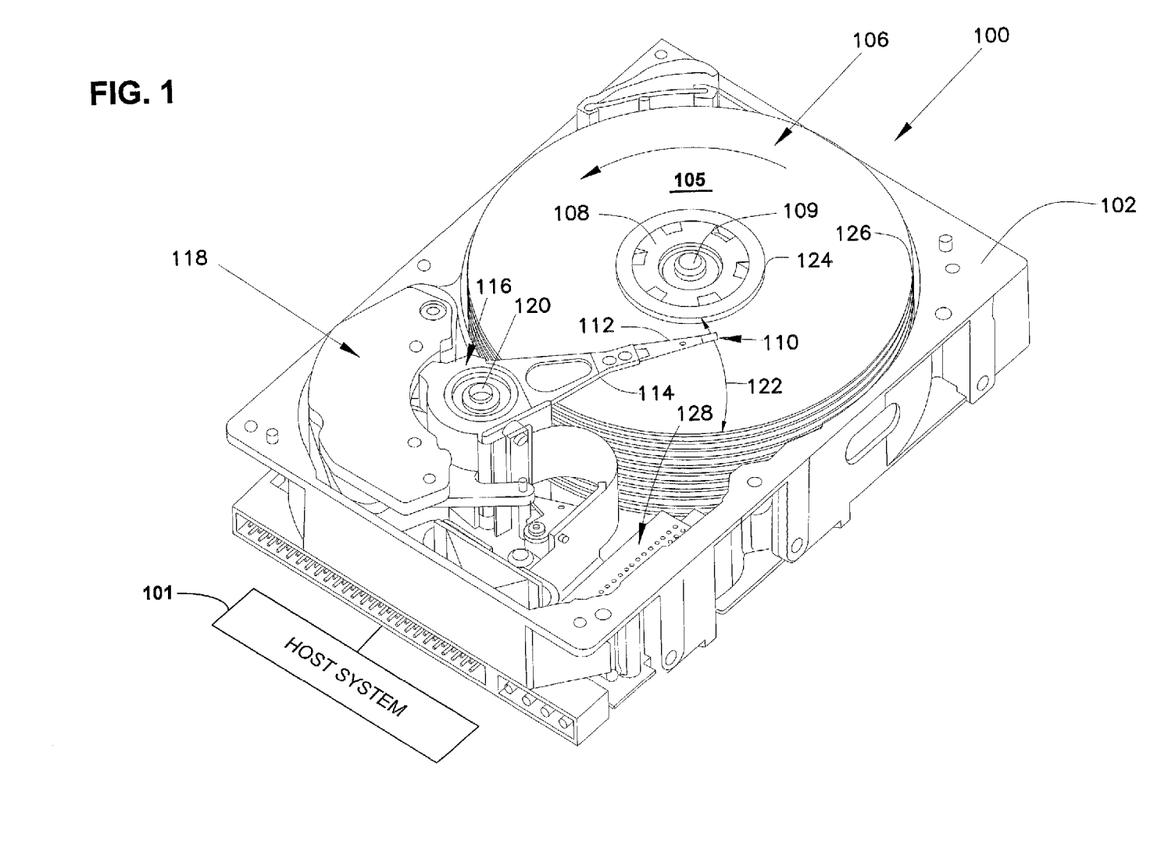
FIG. 1 is a perspective view of a disc drive with which various embodiments of the present invention are useful.

FIG. 1 illustrates a perspective view of a magnetic disc drive 100 in which various embodiments of the present invention are useful. The same reference numerals are used in the various figures to represent the same or similar elements. Host system 101 utilizes disc drive 100 for data storage. Disc drive 100 includes a housing with a base 102 and a top cover (not shown). Disc drive 100 further includes a plurality of individual discs 105 in disc pack 106, which is mounted on a spindle motor 107 (FIG. 2) by a disc clamp 108. The plurality of individual discs 105 are mounted for co-rotation about central axis 109.

Each disc surface has an associated slider 110, which is mounted in disc drive 100 and carries a read/write head for communication with the disc surface. In the example shown in FIG. 1, sliders 110 are supported by suspensions 112, which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position slider 110 over a desired data track along a path 122 between a disc inner diameter 124 and a disc outer diameter 126. Voice coil motor 118 operates under the control of a closed-loop servo controller within internal circuitry 128 (including a disc controller 129 in FIG. 2) based on position information, which is stored on one or more of the disc surfaces within dedicated servo fields. The servo field can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the position of the head so that it moves toward the desired position. Once the transducing head is appropriately positioned, disc controller 129 can then execute a desired read or write operation.

Figure 2:
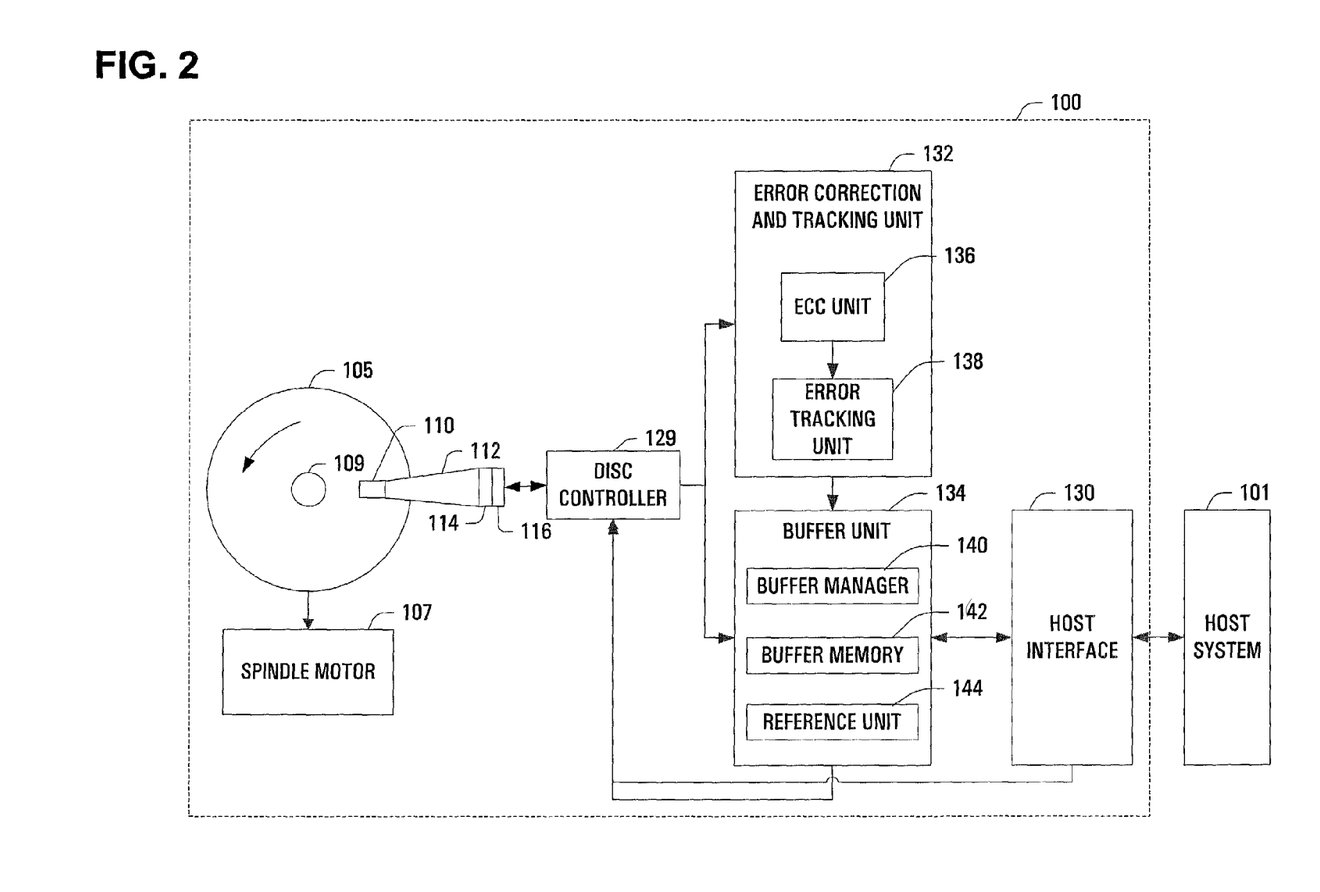
FIG. 2 a schematic diagram of a disc drive in accordance with the present invention.

FIG. 2 illustrates a schematic diagram of disc drive 100 in accordance with one embodiment of the present invention. Spindle motor 107 rotates disc 105 about central axis 109 at a high speed. Slider 110, which carriers a read/write head, is supported by suspension 112. Suspension 112 is connected to track accessing arm 114 of actuator 116, herein schematically illustrated. Disc controller 129 directs the position of actuator 116 to access data from disc 105 with slider 110. Disc controller 129 is operably coupled to the read/write head of slider 110 to selectively read and write particular sectors. Host system 101 is in communication with disc controller 129 through host interface 130. Host interface 130 is adapted to receive commands from host system 101 and provide them to disc controller 129 in order to operate disc drive 100 in accordance with these commands. When a read operation is sent from host 101 to host interface 130, host interface 130 directs disc controller 129 to read from disc 105. Disc controller 129 determines the number of data sectors to be read and reads all of the number of data sectors from disc 105 into error correction and tracking unit 132 and buffer unit 134. Error correction and tracking unit 132 provides error correction and tracking of data received from disc controller 129 while buffer unit 134 provides temporary storage for data read from disc controller 129. Although herein illustrated as separate units, those skilled in the art will recognize that disc controller 129, error correction and tracking unit 132 and buffer unit 134 may be part of a single integrated circuit (IC) and also be part of internal circuitry 128.

Error correction and tracking unit 132 includes error correction code (ECC) unit 136 and error tracking unit 138. ECC unit 136 performs error correction on data using error correction code, typically through use of an algorithm, parity bits or other method. Any type of error correction may be used to correct data supplied to ECC unit 136. Data supplied to ECC unit 136 is usually a number of sectors read from disc 105. While ECC unit 136 is performing error correction, error tracking unit 138 tracks the number of errors in each data sector, or alternatively monitors an error rate. The number of errors in each data sector is compared with a predefined limit level in error tracking unit 138. A signal is generated based on whether or not the number of errors in each data sector is more than the predefined limit level. If a sector includes more errors than the limit level, that sector is identified as an error sector. Buffer unit 134, in conjunction with buffer manager 140, stores data received from disc controller 129 into buffer memory 142. After receiving error correction and tracking data from error correction and tracking unit 132, buffer manager 140 corrects data stored in buffer memory 142 and stores error tracking data into reference unit 144. Corrected data from buffer memory 142 is sent through host interface 130 to host system 101. If error tracking unit 138 determines that there are error sectors, buffer unit 134 will send a command to disc controller 129 to read only the identified error sectors in a next disc revolution. Buffer unit 134 uses the data in reference unit 144 to determine which sectors are to be read. Data read from the error sectors is then sent from disc controller 129 to error correction and tracking unit 132 and buffer unit 134. ECC unit 136 corrects the error sectors and sends correction information to buffer unit 134. Buffer unit 134, which has stored the error sectors in buffer memory 142, uses buffer manager 140 and correction data from ECC unit 136 to correct the error sectors in buffer memory 142. After error sectors in buffer memory 142 have been corrected, buffer unit 134 sends a write operation to disc controller 129 to write the corrected data back to disc 105 using the data stored in reference unit 144.

Figure 3:
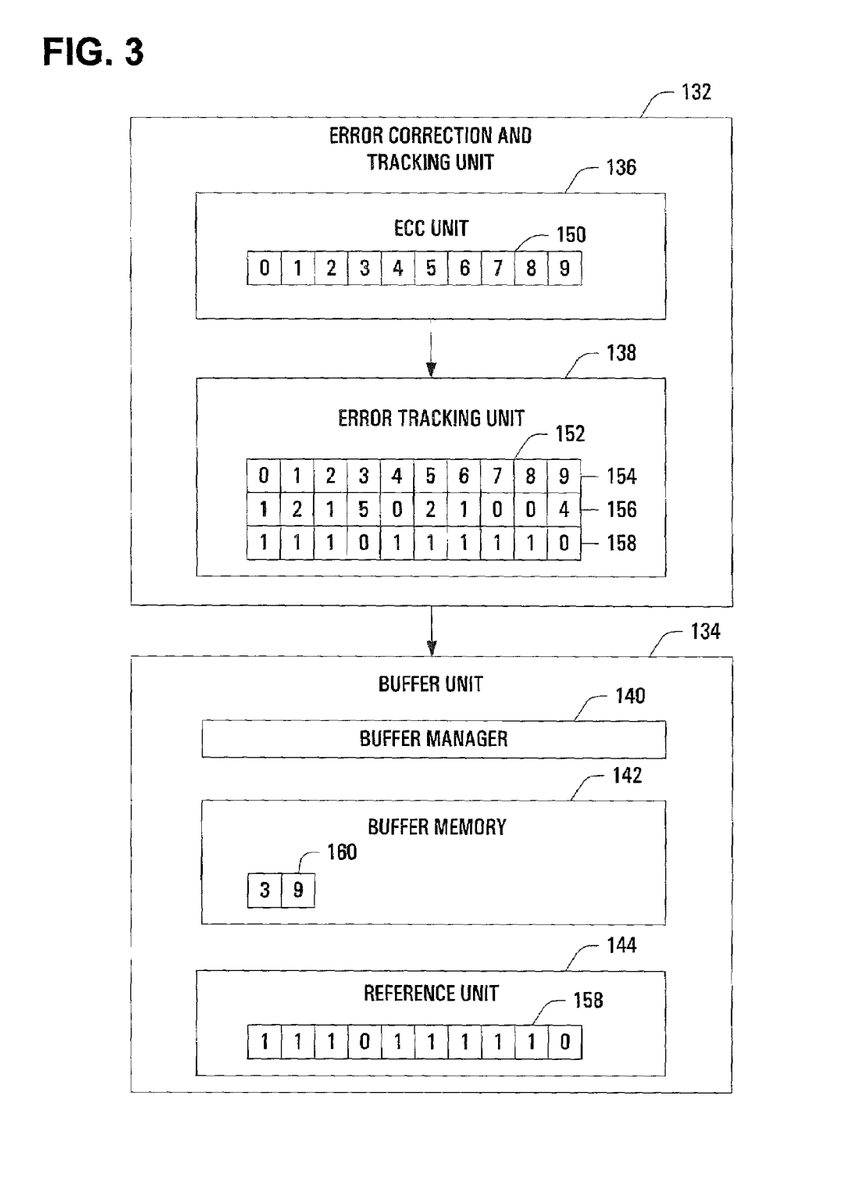
FIG. 3 is a block diagram of an error correction and tracking unit and a buffer unit.

FIG. 3 illustrates an exemplary embodiment for operation of error correction and tracking unit 132 and buffer unit 134. Data unit 150 has been read into ECC unit 136 to determine if any errors exist. In this example, data unit 150 includes ten sectors (numbered 0–9). Error tracking unit 138 tracks the errors corrected by ECC unit 136 and develops table 152 containing information pertinent to tracking the data. Error tracking unit 138 tracks errors that correspond to symbols that are incorrect, known as "symbol errors", although error tracking unit 138 can track other errors such as bit errors. A symbol can be a word, byte, sector, 8-bit segment, 10-bit segment or any other unit of data. Table 152 can include rows 154, 156 and 158. Row 154 corresponds to an identifier of each data sector in data unit 150. Row 156 is the number of symbol errors that occur in each of the sectors of data unit 150. Error tracking unit 138 can provide a signal of whether a particular sector is an error sector or not. In this example, a threshold of three symbol errors per sector is used to determine whether a particular sector is an error sector or not and stores the signal in row 158. The threshold value is programmable and can be stored in internal circuitry 128 (FIG. 1). Those skilled in the art will recognize that a maximum error correction level can be used that is independent of the threshold level. For example, an ECC unit may have a maximum correction level of five errors per symbol. In contrast, the threshold level can be three symbol errors per sector. In current systems, a lower error correction level would be set to reduce growth errors. If a sector was encountered above the error correction level, a retry routine would be used, even though the error is correctable, to prevent growth errors. With the present invention, the maximum error correction level can be used continuously since the threshold level is in place to rewrite error sectors. Even though a particular sector has more errors than the threshold, the sector can be corrected and sent to host 101. Row 158 is generated based upon a comparison between the number of errors for each sector, which is contained in row 156, and the threshold. As illustrated, sectors 3 and 9 have a number of errors above the threshold and thus a '0' bit is generated in row 158. Sectors 0–2 and 4–8 have a number of errors less than the threshold and thus a '1' bit is generated in row 158. Row 158 thus contains logic signals or flags that indicate whether particular sectors are error sectors or not. Row 158 can be referred to as a "skip mask".

Skip mask 158 can then be stored in reference unit 144 of buffer unit 134 for use by disc controller 129 (FIG. 2) to determine what sectors are to be read and written during subsequent disc revolutions. For example, during a next disc revolution, data from sectors 3 and 9 (error sectors) can be read into buffer memory 142 as data unit 160. After data unit 160 has been corrected using ECC unit 136, corrected data unit 160 is written to the disc using skip mask 158 in a next disc revolution.

Figure 31:
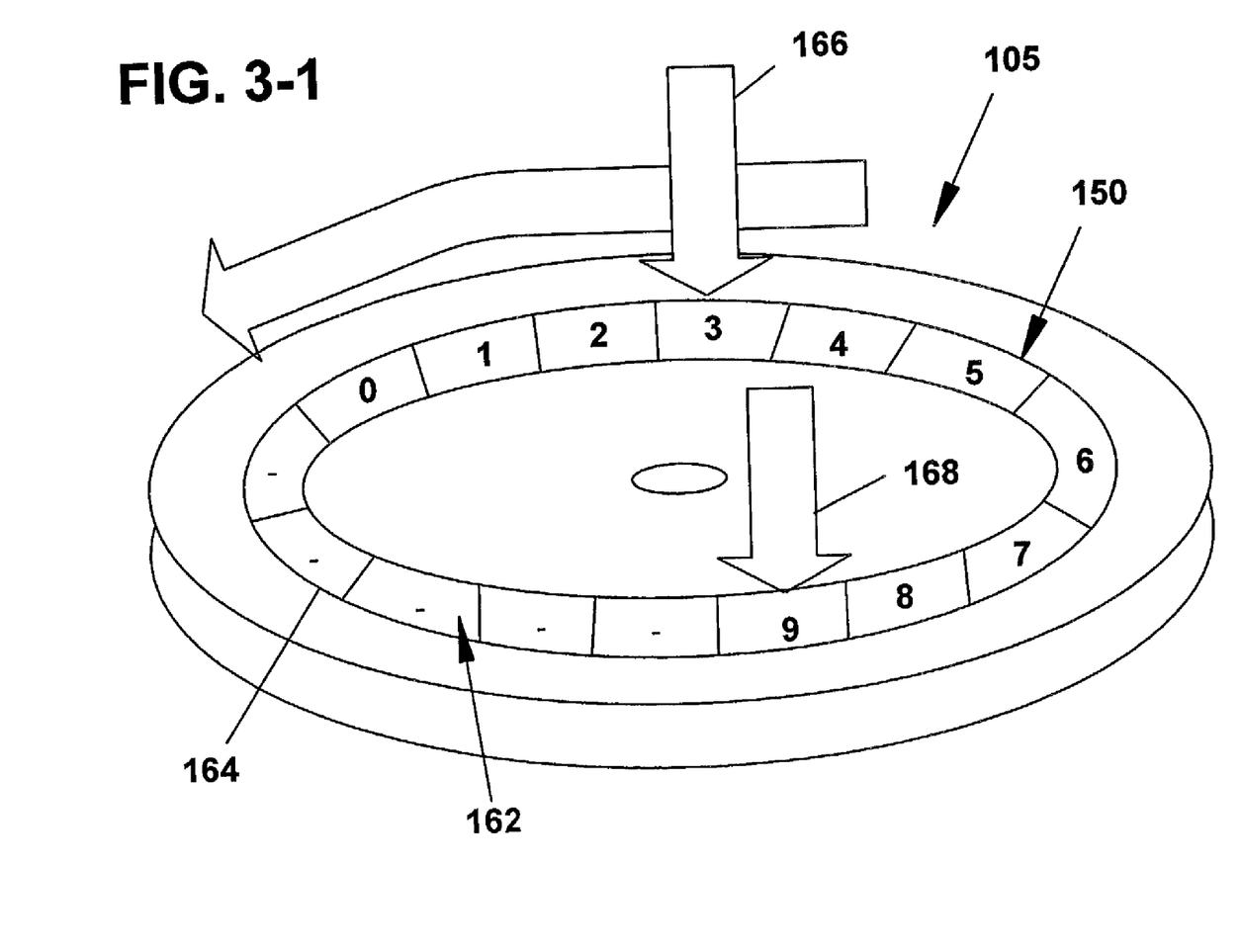

FIG. 3-1 illustrates disc 105 having a plurality of sectors 162 along data track 164. As illustrated, data unit 150 includes sectors 0–9 of the plurality of sectors 162 along data track 164. Arrows 166 and 168 point to error sectors 3 and 9, respectively.

Figure 4:
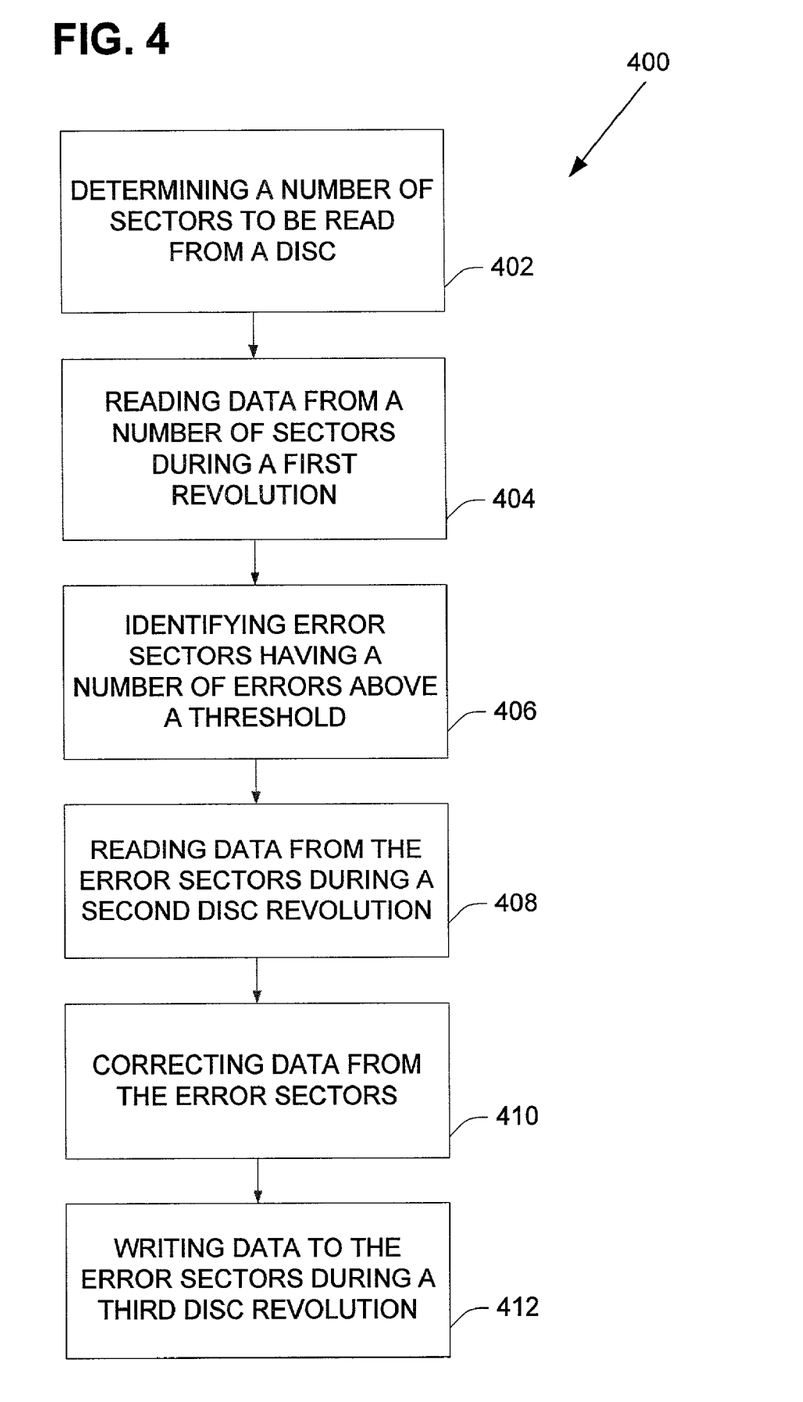
FIG. 4 is a flow chart illustrating a method of error correction according to one embodiment of the present invention.

FIG. 4 illustrates a flowchart of a method of correcting errors in accordance with an embodiment of the present invention. For illustrative purposes, method 400 is described with reference to elements previously discussed having similar reference numerals. First, a number of sectors to be read is determined by disc controller 129 in step 402. Further, method 400 includes step 404 of reading data from all sectors of the number of sectors during a first disc revolution. During this step, disc controller 129 reads data from all of the number of sectors on disc 105 according to a command from host system 101. During step 406, error tracking unit 138 identifies error sectors having a number of errors above a predetermined threshold. This identification can be stored in skip mask 158, for example. Using the signals from skip mask 158, data can be read from only the error sectors during a second disc revolution in step 408 based on the signals for each sector indicative of whether each sector is an error sector or not. Alternatively, data from the error sectors can be maintained in buffer memory 142, without the need for step 408. After data from the error sectors is read, ECC unit 136 corrects the data from the error sectors in buffer memory 142 using buffer manager 140 during step 410. After the data is corrected, buffer unit 134, again using skip mask 158, writes data to the error sectors on the disc during a third disc revolution in step 412.

In summary, one embodiment of the present invention is directed to a method (400) for reducing growth errors in a disc drive storage system (100). The method includes determining (402) a number of sectors to be read from a disc (105). Also, data (150) is read (404) from all sectors of the number of sectors during a first disc revolution. Next, error sectors having a number of errors above a predetermined threshold are identified (406). As used herein and in the appended claims, a number of errors can be an actual number or error rate. In addition, the method includes correcting (410) the data (160) from the error sectors. Corrected data is written (412) to the error sectors during a second disc revolution.

Another embodiment directed to the present invention is a disc drive storage system, (100). The disc drive storage system (100) includes a rotating disc (105) having a disc surface. A transducer is configured to read and write data from the disc surface. The disc drive also has a buffer memory (142) and a controller (129) configured to determine a number of sectors to be read from the disc (105). The controller (129) is also configured to read all sectors of the number of sectors on a disc (105) during a first disc revolution and identify error sectors having a number of errors above a predetermined threshold. Further, the controller (129) is configured to correct data from the error sectors and write corrected data to the error sectors during a second disc revolution.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed For example, the particular elements may vary depending on the particular application for the error correction system while maintaining substantially the same functionality without departing from the scope and spirit of the present invention. In addition, although the preferred embodiment described herein is directed to an error correction system for a disc drive, it will be appreciated by those skilled in the art that the teachings of the present invention can be applied to other error correction systems, without departing from the scope and spirit of the present invention.

What is claimed is:

1. A method in a data storage system having a storage medium comprising a plurality of tracks, each track comprising a plurality of sectors, the method comprising:
    determining a number of sectors to be read from the storage medium;
    reading data from all sectors of the number of sectors during a first operation of the data storage system;
    identifying error sectors having a number of errors above a predetermined threshold;
    providing a signal for each sector indicative of whether each sector is an error sector or a non-error sector;
    generating a mask based on the signals;
    correcting the data from the error sectors; and
    writing corrected data to only the error sectors based on the signals for each sector indicative of whether each sector is an error sector or a non-error sector during a second operation of the data storage system.

2. The method of claim 1 wherein the step of identifying includes tracking a number of errors in each sector.

3. The method of claim 1, and further comprising storing the mask in a buffer.

4. The method of claim 1 and further comprising reading data from only the error sectors during an intermediate operation of the data storage system.

5. The method of claim 4 wherein the intermediate operation of the data storage system occurs between the first and second operations of the data storage system.

6. The method of claim 1 wherein the step of reading data from the error sectors includes storing data in a buffer.

7. The method of claim 1 wherein the step of correcting includes using error correction code.

8. A data storage system, comprising:
    a storage medium, the storage medium comprising a plurality of tracks, each track comprising a plurality of sectors;
    a buffer memory;
    a channel configured to read data from and write data to the storage medium; and
    a controller operably coupled to the channel and configured to determine a number of sectors to be read from the storage medium, read all sectors of the number of sectors on the storage medium during a first operation of the data storage system, identify error sectors having a number of errors above a predetermined threshold, generate a mask containing signals for the number of sectors indicative of whether each sector is an eror sector or a non-error sector, correct the data from the error sectors and selectively read data from and write corrected data to only the error sectors on the storage medium based on the mask during a second operation of the data storage system.

9. The data storage system drive storage system of claim 8 wherein the controller is further configured to track the number of errors occurring in each sector.

10. The data storage system of claim 8 wherein the mask is stored in the buffer memory.

11. The data storage system of claim 8, wherein the storage medium controller is further configured to read data from only the error sectors during an intermediate operation of the data storage system, occurring between the first and second operations of the data storage system.

12. The data storage system drive storage system of claim 8 wherein the controller further comprises an error correction code unit to correct the data from the error sectors.

13. The data storage system of claim 8 wherein the controller is further configured to store the data from the error sectors in the buffer memory.

* * * * *